United States Patent

Okuda et al.

Patent Number: 5,270,894
Date of Patent: Dec. 14, 1993

[54] MIG MAGNETIC HEAD STRUCTURED TO MINIMIZE PSEUDO-GAP PROBLEM

[75] Inventors: Horiyuki Okuda; Isao Tanaka, both of Osaka; Jyoichi Tamada, Nara; Kazuo Ino, Osaka; Takashi Ogura, Osaka; Fumio Kameoka, Osaka; Kouzo Ishihara, Mie, all of Japan

[73] Assignee: Sanyo Electric Co., Ltd., Osaka, Japan

[21] Appl. No.: 28,171

[22] Filed: Mar. 9, 1993

Related U.S. Application Data

[62] Division of Ser. No. 813,751, Dec. 31, 1991, Pat. No. 5,218,500.

[30] Foreign Application Priority Data

| Jan. 8, 1991 | [JP] | Japan | 3-587 |
| Apr. 12, 1991 | [JP] | Japan | 3-79898 |
| Oct. 4, 1991 | [JP] | Japan | 3-257974 |

[51] Int. Cl.⁵ .................. G11B 5/31; G11B 5/23
[52] U.S. Cl. ............................ 360/126; 360/120
[58] Field of Search ............ 360/126, 127, 120

[56] References Cited

U.S. PATENT DOCUMENTS

| 4,926,276 | 5/1990 | Orikasa et al. | 360/126 |
| 5,031,063 | 7/1991 | Hasegawa | 360/126 |
| 5,038,242 | 8/1991 | Fukushima et al. | 360/126 |
| 5,084,795 | 1/1992 | Sakakima et al. | 360/120 |
| 5,173,823 | 12/1992 | Hasegawa | 360/120 |

Primary Examiner—Robert S. Tupper
Attorney, Agent, or Firm—Finnegan, Henderson, Farabow, Garrett & Dunner

[57] ABSTRACT

A parallel type MIG (Metal in Gap) magnetic head includes single-crystal ferrite core halves with a thin ferromagnetic film formed on the gap-forming face of at least one of the core halves. The core halves are joined together using a glass having an Fe content in the range of 2–13 at %. The crystalline geometry of the principal magnetic path forming faces and gap forming faces of the core halves is selected to minimize the pseudo-gap problem and to improve reproduction output.

7 Claims, 9 Drawing Sheets

AZIMUTH ANGLE

AZIMUTH ANGLE

AZIMUTH ANGLE

MIG MAGNETIC HEAD STRUCTURED TO MINIMIZE PSEUDO-GAP PROBLEM

This is a division of application Ser. No. 07/813,751, filed Dec. 31, 1991, U.S. Pat. No. 5,218,500.

BACKGROUND OF THE INVENTION

This invention relates to a magnetic head for use in magnetic recording and reproducing apparatus such as a video tape recorder (VTR), a digital audio tape recorder (DAT) or a hard disk drive (HDD).

In the art of magnetic recording apparatus such as VTRs, recently, the recording density either temporally (e.g. by broadening the frequency band) or spatially (e.g. by decreasing the track width or shortening the wavelength) are increased. Focusing on the shortening of the wavelength, in order to perform shorter-wavelength magnetic recording, it is desirable to use magnetic media having high coercive force. Magnetic heads suitable for use with such high-coercivity media are required to satisfy various conditions including not only the high-frequency characteristics and high wear resistance of the magnetic core (these are the normal requirements to be satisfied by conventional magnetic heads) but also the high resistance to magnetic saturation in the neighborhood of the gap in the magnetic core where magnetic flux is concentrated during recording.

A conventional magnetic head that is known to satisfy these requirements is of a MIG (metal-in-gap) structure which, as shown in FIG. 6, comprises a pair of magnetic core halves 1a and 1b generally that an made of a ferromagnetic oxide having good high-frequency characteristics and that are fitted with thin ferromagnetic metal films 3a and 3b of high saturation magnetic flux density in the gap-forming areas of the core halves 1a and 1b. The pair of the magnetic core by a glass 5 which is located near the magnetic gap. The magnetic head in which the interface between the ferromagnetic oxide core halves 1a, 1b and the thin ferromagnetic metal film 3a, 3b is parallel to the gap face 4 is called as a parallel type MIG head. In this parallel type MIG head, the interface defined above acts as a pseudo-gap and this has caused the problem that "beats" occur in the frequency characteristic curve of the reproduction output as shown in FIG. 7. U.S. Pat. No. 4,953,049 proposes that this pseudo-gap problem be solved by a process that comprises grinding and polishing the gap-forming faces of magnetic cores, performing treatments such as phosphate etching and reverse sputtering to have an integral crystal surface exposed on the gap forming faces of the ferromagnetic oxide cores, and forming thin ferromagnetic metal films 3a and 3b on those faces, with intervening thin heat-resistant films 2a and 2b having a thickness of at least 1 nm but not more than a tenth of the gap length.

The aforementioned patent also states that in the case of a single-crystal ferrite being used as the ferromagnetic oxide core material, the effectiveness of the proposed technique depends on the crystal orientation of the ferrite cores and more advantageous results are obtained if the gap-forming faces are {100} planes of a single ferrite crystal than when they are {111} planes. However, a great variety of combinations are conceivable for the crystal orientations of the gap-forming faces and the principal magnetic path forming face, and it is not easy to predict how the reproduction output of the parallel type MIG head or the effectiveness of the proposed method for solving the "pseudo-gap" problem will depend on the crystal orientation of the ferrite cores. Furthermore, very few experimental data have been reported in this regard.

The present inventors made an experiment to find the influence of the pseudo-gap. Two samples of the magnetic head having the construction shown in FIG. 6 are fabricated. One of them was sample A in which the gap-forming faces of the magnetic core halves 1a and 1b were defined by a {100} plane, the surfaces opposing to a recording medium were defined by a {110} plane and the magnetic path forming faces were defined by a {110} plane, so that the <110> direction in the magnetic path forming face of each core half would be parallel to the gap-forming faces, and the other sample was designated B, in which the gap-forming faces of the magnetic core halves 1a and 1b were defined by a {111} plane, the surfaces opposing to a recording medium were defined by a {211} plane and the magnetic path forming faces were defined by a {110} plane, and the <110> direction in the magnetic path forming face of one core half would depart from the <110> direction in the magnetic path forming face of the other core half towards the faces in contact with a recording medium. Using those two samples of magnetic head, the present inventor investigated the magnitude of beats in the reproduced signal, as well as the intensity of the reproduction output. The results obtained are shown in Table 1 below.

In fabricating samples A and B, the two magnetic core halves were joined together at a working temperature of about 700° C. by glass having a softening point of about 600° C., and a substrate film of heat-proof thin film made of $SiO_2$ that would serve as a pseudo-gap inhibitor was formed in a thickness of 50[nm] at the interface between each of the core halves 1a and 1b and the thin magnetic metal film 3a and 3b.

TABLE 1

| Sample | Beat (dB) | Reproduction output (dB) |
|---|---|---|
| A | 0.5 | 0 (Ref.) |
| B | 1.2 | +2 |

As one can see from Table 1, magnetic head sample A produced small beats due to the pseudo-gap but, at the same time, its reproduction output was also small. On the other hand, sample B reproduced a higher output but, at the same time, it produced greater beats due to the pseudo-gap. Thus, it was impossible for the above-described conventional methods to satisfy the following two requirements simultaneously: reducing the intensity of beats due to the pseudo-gap and improving the reproduction output.

SUMMARY OF THE INVENTION

The present invention has been accomplished under these circumstances and it is an object of the present invention to solve the aforementioned "pseudo-gap" problem of the parallel type MIG head and to improve its reproduction output. Specifically, this invention is to provide a magnetic head which uses a single-crystal ferrite as the ferromagnetic oxide core material and which yet has a more effective crystal orientation in the single-crystal ferrite core portion than combination of the {110} plane for making the principal magnetic path and the {100} gap-forming plane as recommended by the aforementioned U.S. Pat. No. 4,953,049.

According to a first aspect of the present invention, a magnetic head comprises a pair of ferrite magnetic core halves, at least one of the magnetic core halves having a thin ferromagnetic metal film formed on the gap-forming face, the thin ferromagnetic metal film on said one magnetic core half abutting against the another magnetic core half to form a magnetic gap, the pair of magnetic core halves being joined together by means of glass located near said magnetic gap, and the magnetic gap being parallel to the interface between the one magnetic core half and the thin ferromagnetic metal film, that magnetic head is characterized in that said glass has an Fe content in the range of 2-13 at% of the glass composition excluding oxygen.

According to a second aspect of the present invention, a magnetic head comprises a pair of magnetic core halves made of a single-crystal ferrite, at least one of the magnetic core halves having a thin ferromagnetic metal film formed on the gap-forming face, and the thin ferromagnetic metal film abutting against the other magnetic core half with a non-magnetic material being interposed to form a magnetic gap, the principal magnetic path forming face of the magnetic core half provided with the thin ferromagnetic metal film has a crystal plane substantially designated by {211} whereas a vector A that is parallel to the <110> crystal axis in said principal magnetic path forming face and that is directed away from the gap-forming face forms an angle $\theta$ of the range 0°-60° or 150°-180° with a vector B that is parallel to the intersection of the principal magnetic path forming face and the gap-forming face and that approaches the face opposite to a recording medium.

According to a third aspect of the present invention, a magnetic head comprises a pair of magnetic core halves made of a single-crystal ferrite, at least one of the magnetic core halves having a thin ferromagnetic metal film formed on the gap-forming face, and the thin ferromagnetic metal film abutting against the other magnetic core half with a non-magnetic material being interposed to form a magnetic gap, the principal magnetic path forming face of the magnetic core half provided with the thin ferromagnetic metal film being a crystal plane substantially designated by {211} whereas the gap-forming face being a crystal plane substantially designated by {111}.

If the glass having the composition set forth above is used, the reaction between oxygen (O) in the glass and iron (Fe) in the ferrite of which the magnetic core halves are made is sufficiently suppressed to insure that it will cause only negligible adverse effects on the interface between each core half and the associated metallic magnetic substance, thereby minimizing the pseudo-gap.

It has been verified experimentally that compared to the parallel type MIG head that has a single-ferrite core portion and in which the principal magnetic path forming face and the gap-forming face are defined by {110} and {100} planes, respectively, as recommended in U.S. Pat. No. 4,953,049, each of the magnetic heads according to the present invention are at least equal or superior in their effectiveness in solving the problem of "pseudo-gap" in the parallel type MIG head and improving its reproduction output.

DESCRIPTION OF THE PREFERRED EMBODIMENTS

The magnetic head of the present invention is described below in detail.

Figure 6:
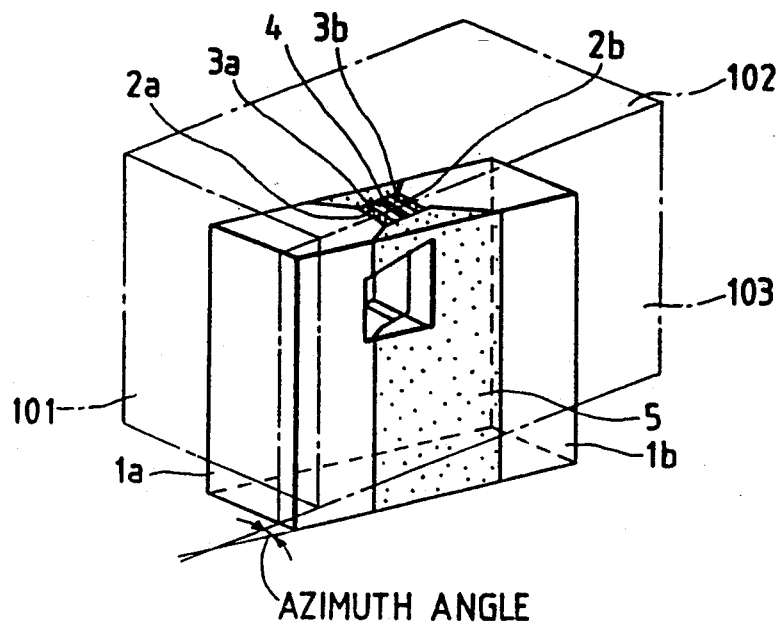
FIG. 6 is a perspective view showing the general appearance of a MIG magnetic head.

In this embodiment of a magnetic head of the construction shown in FIG. 6 were fabricated in the same manner as was sample B. In other words, the first and second magnetic core halves 1a and 1b had such crystal orientations that their gap-forming faces were defined by a {111} plane, the faces opposing to a recording medium were defined by a {211} plane and the principal magnetic path forming faces were defined by a {110} plane, and the <110> direction in the principal magnetic path forming face of one core half would depart from the <110> direction in the principal magnetic path forming face of the other core half towards the faces opposing to a recording medium. In addition, a substrate film of $SiO_2$ serving as a pseudo-gap inhibitor was formed in a thickness of 50 [nm] between each of the first and second magnetic core halves 1a and 1b and the thin magnetic metal film 3a and 3b. The two magnetic core halves were joined together with various samples of glass 5 as identified by a-j. Using the thus fabricated magnetic heads, the intensity of beats in the reproduced signal were investigated.

The compositions of glass samples a-j and the intensity of beats that took place in the signal reproduced when each glass sample was used are shown in Table 2 below. The glass composition data in Table 2 refer to the values that do not count in the oxygen atoms in the glass.

Glass samples a-g shown in Table 2 were each a non-borosilicate, low-melting point glass whereas samples h-j were each a borosilicate, low-melting point glass.

The compositions of the glasses are determined as shown in the Table 2 so that the glasses have softening points in a range of 450°-550° C., and coefficients of thermal expansion in a range of $90 \times 10^{-7}$ to $100 \times 10^{-7}/°$ C. In the embodiment under discussion, the thin magnetic metal films 3a and 3b were formed of an Fe-Al-Si base metallic magnetic material (82.55 wt% Fe, 7.11 wt% Al, 9.70 wt% Si and 0.64 wt% Cr; Hereinafter, it will be referred as Sendust)

TABLE 2

| Sample | Glass Composition (at %) and Beats | | | | | | | | |
|---|---|---|---|---|---|---|---|---|---|
| | Pb | Si | Na | K | Zn | Fe | B | Al | Beat (dB) |
| a | 32.2 | 43.8 | 11.8 | 1.9 | 5.7 | 4.6 | 0.0 | 0.0 | 0.42 |
| b | 33.5 | 46.5 | 9.8 | 1.9 | 6.7 | 1.6 | 0.0 | 0.0 | 0.72 |
| c | 30.7 | 51.0 | 7.4 | 2.1 | 8.5 | 0.3 | 0.0 | 0.0 | 0.88 |
| d | 31.1 | 52.3 | 5.4 | 2.6 | 7.5 | 1.1 | 0.0 | 0.0 | 0.66 |
| e | 36.9 | 47.0 | 3.9 | 2.1 | 7.1 | 3.0 | 0.0 | 0.0 | 0.45 |
| f | 32.5 | 48.1 | 9.5 | 2.2 | 7.7 | 0.0 | 0.0 | 0.0 | 1.24 |
| g | 28.1 | 42.8 | 8.9 | 2.1 | 9.0 | 9.6 | 0.0 | 0.0 | 0.38 |
| h | 27.6 | 29.5 | 3.5 | 1.2 | 4.9 | 0.9 | 29.3 | 3.1 | 0.64 |
| i | 32.4 | 35.9 | 2.5 | 1.9 | 7.2 | 3.7 | 16.4 | 0.0 | 0.50 |
| j | 30.4 | 31.2 | 5.6 | 1.4 | 5.9 | 0.0 | 25.5 | 0.0 | 1.30 |

On the basis of the data shown in Table 2, the relationship between the contents of the glass composition and the intensity of beats was determined and the result is shown graphically in FIGS. 11A to 11F.

As shown in FIGS. 11A to 11E, there is no correlation between the contents of Pb, Si, Na, K, and Zn. However, as is clear from FIG. 11F, the higher the Fe content of glass 5, the smaller the beats in the reproduction output. In particular, large beats occur if the Fe content of glass 5 is not more than 2 at %. Hence, in order to reduce the beats in the reproduction output and to thereby improve the reproduction characteristics, the Fe content of glass 5 must be at least 2 at %. If the Fe content exceeds 4 at %, the intensity of beats becomes constant. If the Fe content further increases to go beyond 13 at %, the temperature range over which an appropriate glass viscosity can be obtained becomes narrow, making it difficult to provide a proper temperature setting for fusing the glass. Therefore, if, in the case where the fusing temperature is too low to have a certain area filled with the glass, the fusing temperature is risen, the glass will then spread excessively so that the greater part of the coil winding slot is filled with the glass. Another disadvantage of a higher Fe content of the glass is that its fusion temperature will increase to cause deterioration in the suppression of the pseudo-gap. Therefore, by using a fused glass that has an Fe content in the range of 2-13 at %, preferably 4-13 at %, magnetic heads producing small beats in the reproduction output can be manufactured with good yield.

As discussed above, the magnetic head having the construction shown in FIG. 6 produced smaller beats in the reproduction output when it used glass 5 having the Fe content within the range of 2-13 at %; a probable reason for this effect is that the mutual diffusion of oxygen (O) in the glass and iron (Fe) in the ferrite was sufficiently suppressed to insure that the substrate film would act effectively as a pseudo-gap inhibitor.

As for the reproduction output, the magnetic head was capable of reproducing as high an output as head sample B (see Table 1) no matter which of glass samples a-j was employed.

As described above, the first and second magnetic core halves 1a and 1b in the magnetic head of the construction shown in FIG. 6 had such crystallographic orientations that their gap-forming faces were defined by a {111} plane, the faces opposing to a recording medium were defined by a {211} plane and the principal magnetic path forming faces were defined by a {110} plane, and the <110> direction in the principal magnetic path forming face of one core half would depart from the <110> direction in the principal magnetic path forming face of the other core half towards the faces opposing to a recording medium. Further, the glass 5 had an Fe content in the range of 2-13 at %, preferably 4-13 at %. Having these features, the magnetic head according to the embodiment produces smaller beats in the reproduction output due to the pseudo-gap while, at the same time, it yields a satisfactorily high reproduction output.

Even if the magnetic head of the embodiment has no substrate film between each of the magnetic core halves 1a and 1b, and the thin magnetic metal film 3, the glass 5 which has the Fe content in the above discussed range effectively suppresses the cross-diffusion of oxygen (O) in the glass and iron (Fe) in the ferrite to thereby reduce the intensity of beats that occur in the reproduction output due to the pseudo-gap.

If desired, the first and second magnetic core halves 1a and 1b may have different crystal orientations than those specified for the embodiment described above. Even in that case, by using the glass 5 having an Fe content of the range 2-13 at %, the occurrence of beats in the reproduction output due to the pseudo-gap can be sufficiently suppressed without lowering said output.

Figure 1:
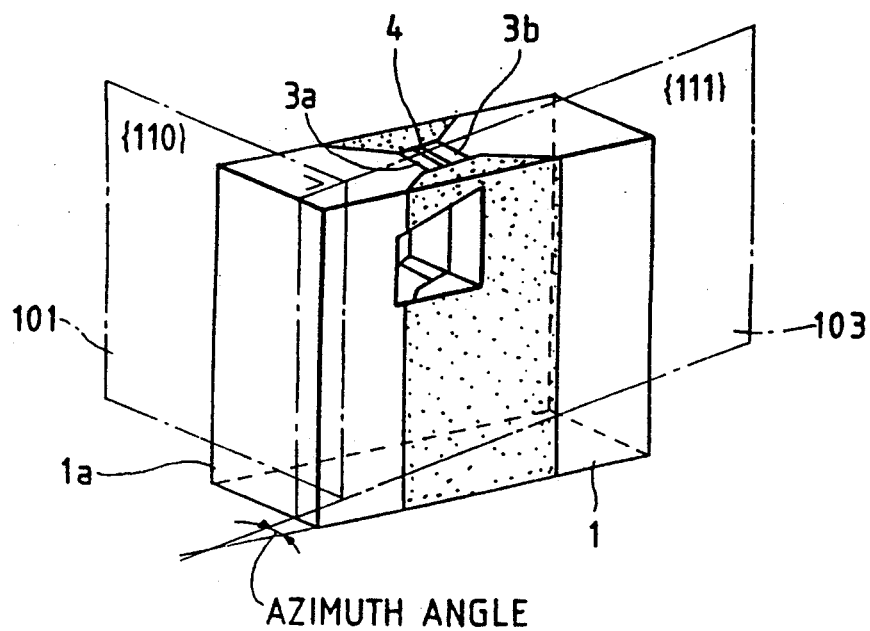
FIG. 1 is a perspective view showing the general appearance of a magnetic head according to first example of the second embodiment of the present invention.
Figure 2:
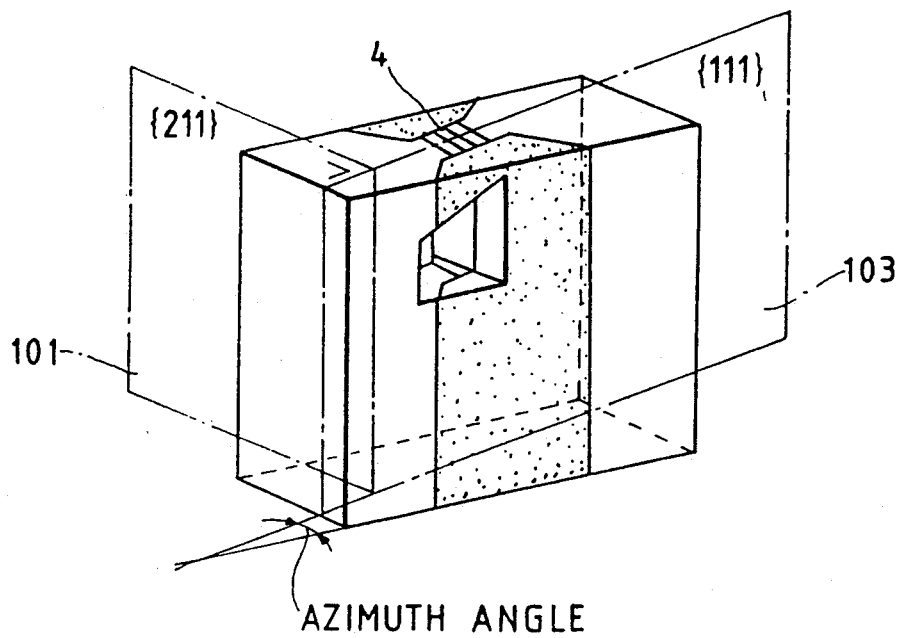
FIG. 2 is a perspective view showing the general appearance of a magnetic head according to second example of the second embodiment of the present invention.
Figure 3:
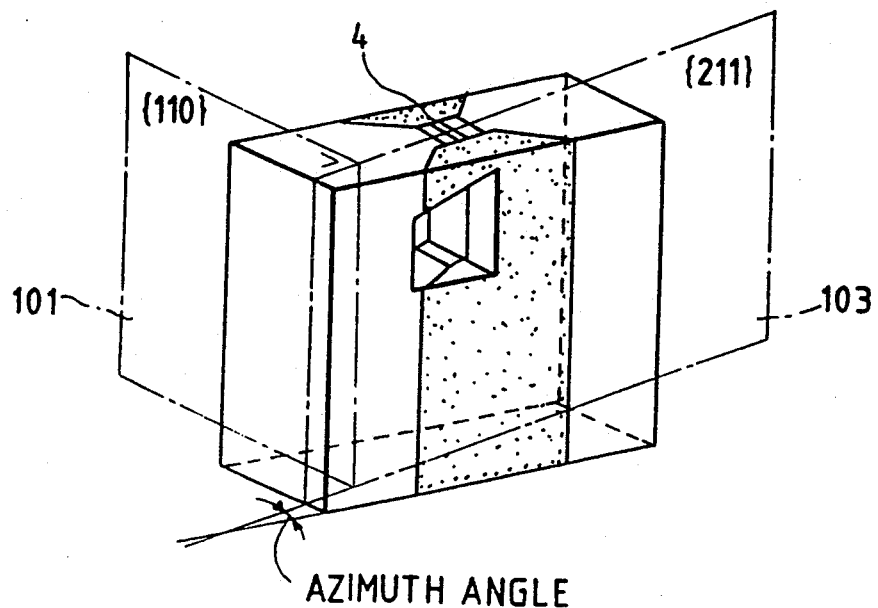
FIG. 3 is a perspective view showing the general appearance of a magnetic head according to third example of the embodiment of the present invention.
Figure 4:
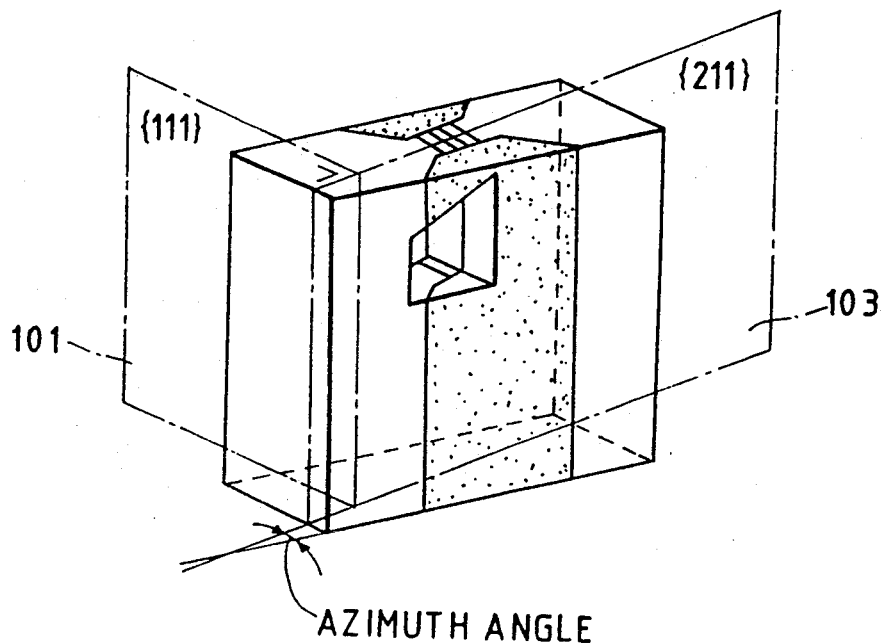
FIG. 4 is a perspective view showing the general appearance of a magnetic head according to fourth example of the embodiment of the present invention.
Figure 5A:
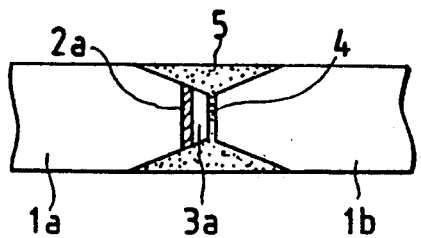
FIGS. 5A to 5D are plan views showing the surface of a magnetic head that is opposite to a recording medium in various example of the present invention.
Figure 5B:
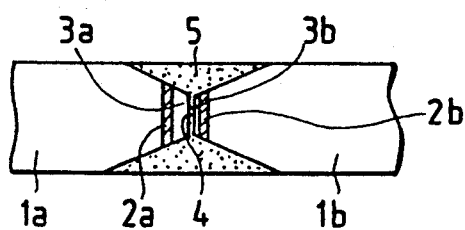
Figure 5C:
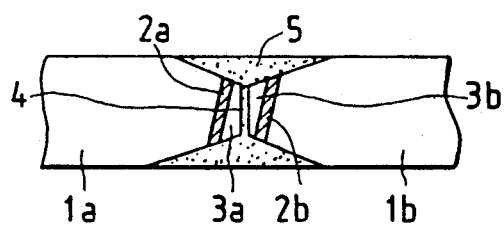
Figure 5D:
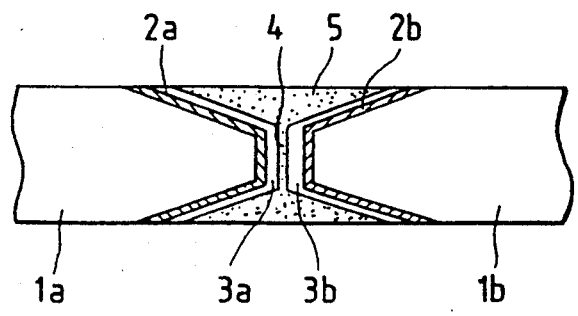

As shown in FIG. 5D, the thin ferromagnetic metal film 3 may be formed in such a way that both of magnetic core halves 1a and 1b make indirect contact with the glass 5. Even this type of magnetic head, that the thin magnetic metal film 3a which is coated on the lateral side of the first magnetic core halves 1a and 1b have no continuity in the crystalline structure of the metal film and the glass will pass through the discontinuity to reach the ferrite. Thus, by using the glass 5 which has an Fe content in the range of 2-13 at %, the occurrence of beats in the reproduction output due to the pseudo-gap can be suppressed.

In the embodiment described above, the desired glass was prepared by a process that consisted of metering a non-magnetic ferrite (e.g., Zn ferrite or Cd ferrite) in an amount that wold provide a fused glass composition having an Fe content of 2-13 at %, mixing that amount of non-magnetic ferrite with the other glass-forming components and melting the mixture. The non-magnetic ferrite is used because if a magnetized or high-permeability glass material were present in the neighborhood of the gap, there would occur shorting of magnetic flux around the gap, whereby the performance of the magnetic head is deteriorated. The non-magnetic ferrite is used in order to avoid this phenomenon.

The non-magnetic ferrite can be incorporated in the glass 5 by other methods than that described above. For example, a non-magnetic ferrite forming oxide (e.g., ZnO or CdO) or carbonate (e.g, $ZnCO_3$ or $CdCO_3$) and ferric oxide ($\alpha$-$Fe_2O_3$) are metered in a molar ratio of 1:1 and melted together with other glass-forming components. Alternatively, a glass former without the non-magnetic ferrite is melted to form glass, which is then ground in to a powder and mixed with a powder of the non-magnetic ferrite, with the mixture being then melted to form glass.

Figure 8:
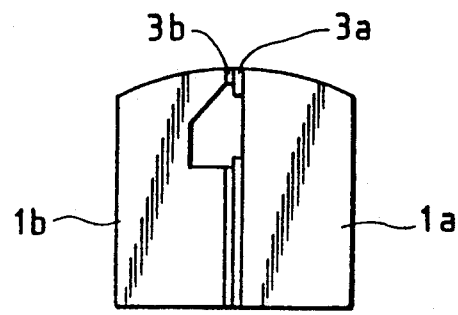
FIG. 8 is a cross-sectional view of the principal magnetic path forming face of a magnetic head.

Another embodiments of the present invention are described below. The present inventors fabricated samples of parallel type MIG head that had a ferromagnetic oxide core portion made of a single-crystal ferrite having the various crystal orientations shown in Table 3 and that had the general appearance and cross-sectional shape shown in FIGS. 6 and 8, respectively. The specifications of had fabrication are shown in Table 4. The beats in the frequency characteristic curve (hereunder referred to as "Frequency characteristic beats") due to the pseudo-gap problem and the reproduction output were measured and the results were as shown in Table 5.

TABLE 3

| Sample No. | Principal magnetic path forming face | Gap-forming face | Surface opposite to recording medium |
|---|---|---|---|
| (1) | {111} | {110} | {211} |
| (2) | {111} | {211} | {110} |
| (3) | {211} | {110} | {111} |
| (4) | {211} | {111} | {110} |
| (5) | {110} | {100} | {110} |

TABLE 4

| Item | specification |
|---|---|
| Ferromagnetic oxide core material | Single crystal of Mn—Zn ferrite |
| Treatment of gap-forming face | Grinding and polishing with diamond grit (1 μm) to a specular surface, followed by etching with concentrated phosphoric acid at 40° C. for 5 min. |
| Heat-resistant thin film | $SiO_2$ (5 nm thick) |
| Thin ferromagnetic metal film | Sendust (6 μm thick) |
| Track width | 58 μm |
| Azimuth angle | 6° |
| Optical gap length | 0.27 μm |
| Gap depth | 20 μm |
| Fused glass | softening point 480° C. average thermal expansion coefficient at R.T. —350° C., $95 \times 10^{-7}$/°C. |
| Coil winding | 21 turns |
| Inductance | $2.0 \pm 0.2$ μH (at 5 MHz) |

TABLE 5

| Sample No. | Frequency characteristic beat (dB) | Reproduction output upper row: absolute value (μV) lower row: ratio to the value of sample No. 5 (dB) | | |
|---|---|---|---|---|
| | | 1 MHz | 5 MHz | 8 MHz |
| (1) | 1.2 | 1160 | 580 | 340 |
| | | +1.5 | +1.5 | +1.7 |
| (2) | 1.5 | 1090 | 600 | 320 |
| | | +0.9 | +1.8 | +1.2 |
| (3) | 1.4 | 1150 | 640 | 360 |
| | | +1.4 | +2.3 | +2.2 |
| (4) | 1.1 | 1380 | 670 | 360 |
| | | +3.0 | +2.7 | +2.2 |
| (5) | 0.5 | 980 | 490 | 280 |
| | | ±0.0 | ±0.0 | ±0.0 |

The processing conditions shown in Table 4 such as those for the treatment of the gap-forming face and the formation of the heat-resistant thin film were in accordance with the conditions employed in solving the "pseudo-gap" problem as proposed by U.S. Pat. No. 4,953,049. further, it should be noted that the fused glass for joining the pair of the magnetic core halves has a glass composition of the example C shown in the table 2.

The terms "principal magnetic path forming face", "gap-forming face" and "surface opposite to recording medium" as used in Table 3 have the same meanings as conventionally used by one skilled in the art and they correspond respectively to those faces which are identified by 103, 101 and 102 in FIG. 6. Stated more specifically, the gap-forming face 101 means a face that is parallel to the face at which the thin ferromagnetic metal film 3a or 3b fitted to one magnetic core half in the MIG head abuts against the other magnetic core half with a non-magnetic material being interposed; the principal magnetic path forming face 103 means a face that includes the shortest magnetic path surrounding the coil winding opening in the head and that is perpendicular to the above-defined gap-forming face 101; and the surface 102 opposite to recording medium means a face that is perpendicular to both the gap-forming face 101 and the principal magnetic path forming face 103.

The principal magnetic path forming face 103, the gap-forming face 101 and the face 102 opposite to recording medium cross one another at right angles, so if the crystal orientations of any two of those faces are determined, the crystal orientation of the other face will be automatically determined. The crystal orientations shown in Table 3 for sample No. 5 are those recommended by aforementioned U.S. Patent and they are intended as a reference for comparison with the samples of the present invention.

The crystal orientations listed for sample Nos. 1–4 in Table 3 may occur in two possible combinations depending upon the location of the crystal axis in a {110} plane that defines the gap-forming face 101 or the face 102 opposite to recording medium. However, there is no need to distinguish them from each other since they are equivalent in consideration of symmetricality with respect to the magnetic path passing through the gap-forming face 101 and the surface 102 opposite to recording medium.

Figure 7:
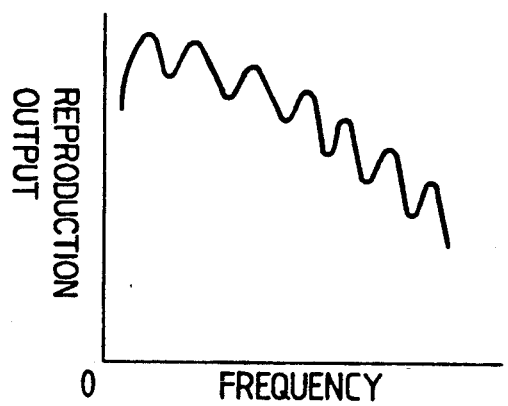
FIG. 7 is a graph showing the frequency characteristic curve of a conventional magnetic head.

The frequency characteristic beat and reproduction output data shown in Table 5 were measured with an iron oxide tape (coercivity: 900 Oe) as a recording medium being run at a speed of 5.8 m/sec relative to the head. In the measurement of frequency characteristic beats, a frequency sweep signal was recorded at 0.1–10 MHz and the reproduction output was detected with a spectrum analyzer to provide a frequency characteristic curve as shown in FIG. 7; thereafter, the peak to peak output ratio was obtained in the frequency range of 3–7 MHz. In the measurement of reproduction output, a sinewave signal was recorded without bias at 1, 5 and 8 MHz and a maximum output was determined from the resulting reproduction output to recording current curve.

The data in Table 5 may be interpreted as follows. If the values for sample Nos. 1–4 are compared with reference to sample No. 5, the frequency characteristic beats for sample Nos. 1–4 are greater by a degree of ca. 0.5–1 dB but their absolute values are not greater than 1.5 dB which is a practically acceptable level. Sample Nos. 1–4 produce that were ca. 1–3 dB greater than the output of sample No. 5 over the low to high frequency range and a particularly high output was produced from sample No. 4. In short, sample Nos. 1–4 were comparable or superior to sample No. 5 in terms of both the effectiveness in solving the pseudo-gap problem and the reproduction output. Particularly good results were attained by sample No. 4. The general appearances of the magnetic heads corresponding to sample Nos. 1-4 are shown in perspective in FIGS. 1-4, respectively.

Based on the experimental results described above, the present inventors extracted the following conclusion which describes the essence of the present invention in connection with a magnetic head that comprises a pair of magnetic core halves made of a single-crystal ferrite, at least one of the magnetic core halves having a thin ferromagnetic metal film formed on the gap-forming face, and the thin ferromagnetic metal film abutting against the other magnetic core half with a non-magnetic material being interposed to form a magnetic gap: "if the crystal orientations of the magnetic core half or halves on which the thin ferromagnetic film is formed are set in either one of the manners specified in Table 1 for sample Nos. 1-4, particularly No. 4, better results are obtained in terms of both the effectiveness in solving the pseudo-gap problem and the reproduction output, as compared to sample No. 5 which adopted as a reference the conditions recommended by the aforementioned U.S Patent."

The third embodiment of the present invention is described below. The present inventors fabricated other samples of parallel type MIG head that had a ferromagnetic oxide core portion made of a single-crystal ferrite having the various crystal orientations shown in Table 6. The specifications of head fabrication were as shown in Table 4. In this embodiment, the glass example A shown in Table 2 is used as a fused glass for joining the magnetic core halves. The frequency characteristic beats due to the pseudo-gap problem and the reproduction output were measured and the results were as shown in Table 6.

The terms "principal magnetic path forming face", "gap-forming face" and the "surface opposite to recording medium" as used in Table 6 have the same meanings as already defined in the preceding embodiment.

Sample No. 7 shown in Table 6 had the crystal orientations recommended by the aforementioned U.S. Patent and will serve as a reference for comparison with sample Nos. 1-6 fabricated in accordance with the present invention.

TABLE 6

| Sample No. | Principal magnetic path forming face | Gap-forming face | Surface opposite to recording medium | θ (deg) | Freq. characteristic beat (dB) | Output at 5 MHz (dB) |
| --- | --- | --- | --- | --- | --- | --- |
| (1) | {211} | {111} | {110} | 0 | 0.6 | +2.2 |
| (2) | {211} | {210} | {521} | 39 | 0.6 | +1.7 |
| (3) | {211} | {521} | {210} | 51 | 0.6 | +1.4 |
| (4) | {211} | {110} | {111} | 90 | 0.9 | +0.3 |
| (5) | {211} | {521} | {210} | 129 | 1.1 | +1.4 |
| (6) | {211} | {210} | {521} | 141 | 1.3 | +1.8 |
| (7) | {110} | {100} | {110} | — | 0.4 | 0.0 |

In sample No. 1 shown in Table 6, the orientations of the principal magnetic path forming face and the surface opposite to recording medium were exchanged with reference to the crystal orientations widely used in single-crystal ferrite heads for VTRs, i.e., a {110} plane for the principal magnetic path forming face, a {111} plane for the gap-forming face, and a {211} plane for the surface opposite to recording medium. In sample Nos. 2-6 shown in Table 4, the principal magnetic path forming face was fixed at the {211} plane as in sample No. 1 whereas the gap-forming face and the surface opposite to recording medium were changed to other principal crystal planes having the smallest possible Miller indices.

Figure 9:
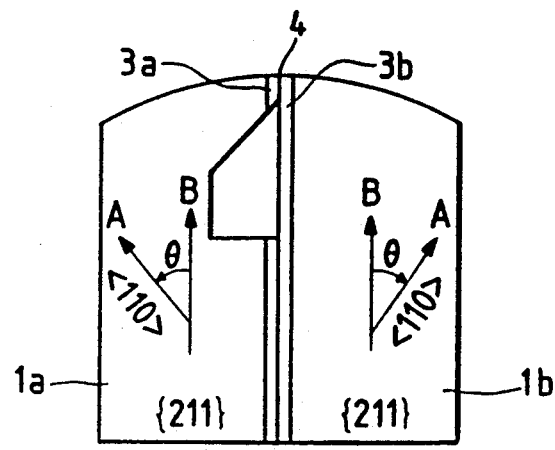
FIG. 9 is a diagram showing the crystal orientations of the principal magnetic path forming face of the magnetic head of the third embodiment.

In Table 6, the principal magnetic path forming face, the gap-forming face and the surface opposite to recording medium are denoted by the same Miller indices for sample Nos. 2 and 6, so are for sample Nos. 3 and 5. However, as one can clearly see considering the asymmetricality of the magnetic paths in the principal magnetic path forming face and the asymmetricality between the various crystal axes in the {211} plane, the faces or surfaces denoted by the same Miller indices are by no means equivalent to each other. In order to make distinction between those faces or surfaces, a new notation for crystal orientations is introduced, in which two vectors, one being vector A that is parallel to the <110> crystal axis in the {211} plane which defines the principal magnetic path forming face and that is directed away from the gap-forming face and the other being vector B that is parallel to the intersection of the principal magnetic path forming face and the gap-forming face and that approaches the face opposite to a recording medium, are assumed and the value of angle θ formed by the two vectors (see FIG. 9) is used to denote a certain crystal orientation.

The frequency characteristic beat and reproduction output data shown in Table 6 were measured with an iron oxide tape (coercivity: 900 Oe) as a recording medium being at a speed of 5.8 m/sec relative to the head. In the measurement of frequency characteristic beats, a frequency sweep signal was recorded at 0.1-10 MHz and the reproduction output was detected with a spectrum analyzer to provide a frequency characteristic curve as shown in FIG. 7; thereafter, the peak-to-peak output ratio was determined in the frequency range of 3-7 MHz. In the measurement of reproduction output, a sinewave signal was recorded without bias at 5 MHz and a maximum output was determined from the resulting reproduction output vs recording current curve, followed by normalization with the value for comparative sample No. 7.

The data in Table 6 may be interpreted as follows. The frequency characteristic beats from sample Nos. 1-3 are smaller than those from sample Nos. 4-6 but are definitely greater than those from comparative sample No. 7. However, according to common sense for one skilled in the art concerning frequency characteristic beats (i.e., with the MIG head for use with DAT, HDD and other digital magnetic recording and reproducing apparatus, the permissible upper level of frequency characteristic beats is approximately 2 dB, and with the MIG head for use with home VTR and other analog magnetic recording and reproducing apparatus, the permissible upper level of frequency characteristic beats is approximately 1 dB), the frequency characteristic beats of such a magnitude as produced from sample Nos. 1-3 will cause no significant problems in practical applications.

As regards the reproduction output, sample Nos. 1-3, as well as 5 and 6 produce obviously higher outputs than comparative sample No. 7, with a particularly high output being produced from sample No. 1.

Based on the experimental results described above, the present inventor extracted the following conclusion which also describes the essence of the present invention in connection with a magnetic head that comprises a pair of magnetic core halves made of a single-crystal ferrite, at least one of the magnetic core halves having a thin ferromagnetic metal film formed on the gap-forming face, and the thin ferromagnetic metal film abutting against the other magnetic core half with a non-magnetic material being interposed to form a magnetic gap "if the crystal orientations of the magnetic core half or halves on which the thin ferromagnetic film is formed are set in either one of the manners specified in Table 6 for sample Nos. 1-3, better results are obtained in terms of both the effectiveness in solving the pseudo-gap problem and the reproduction output, as compared to sample No. 7 which adopted as a reference the conditions recommended by the aforementioned U.S. Patent."

Figure 10:
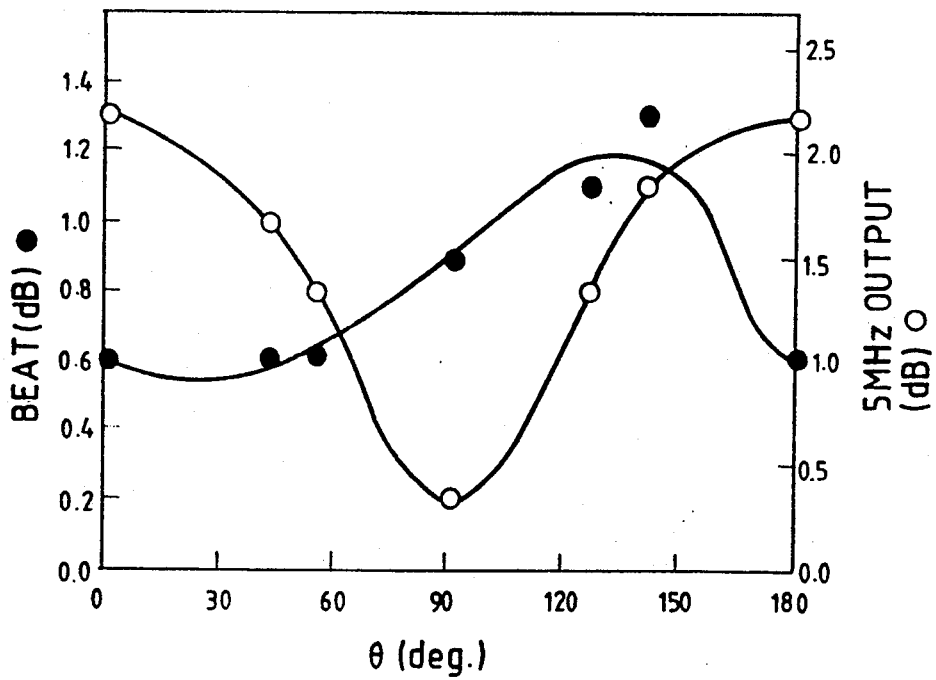
FIG. 10 is a graph showing the results of an experiment conducted to demonstrate the dependency of frequency (F) characteristic beats and the reproduction output on the crystal orientation.
Figure 11A:
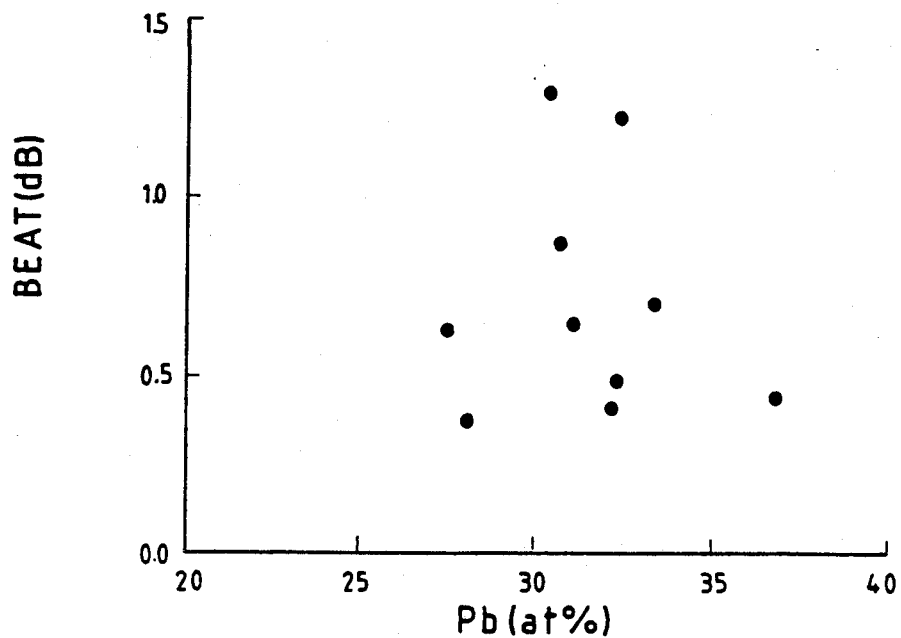
FIGS. 11A to 11F are graphs showing the relationship between the contents of glass and the intensity of beats in the reproduction output.
Figure 11B:
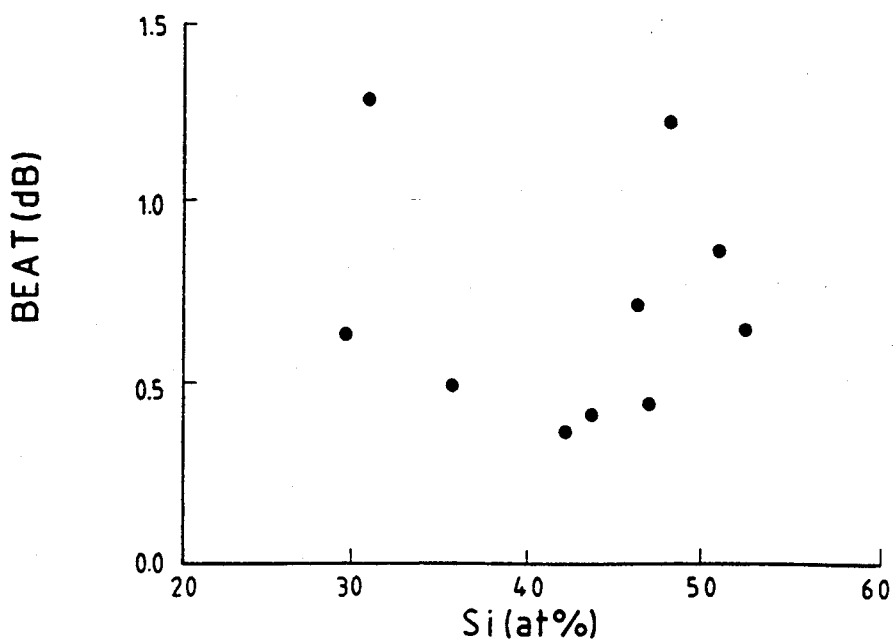
Figure 11C:
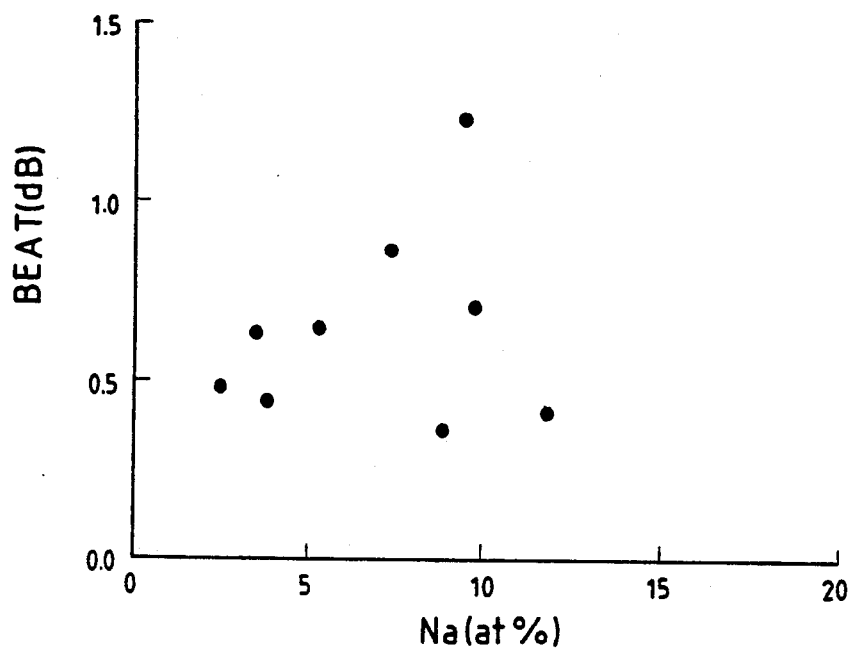
Figure 11D:
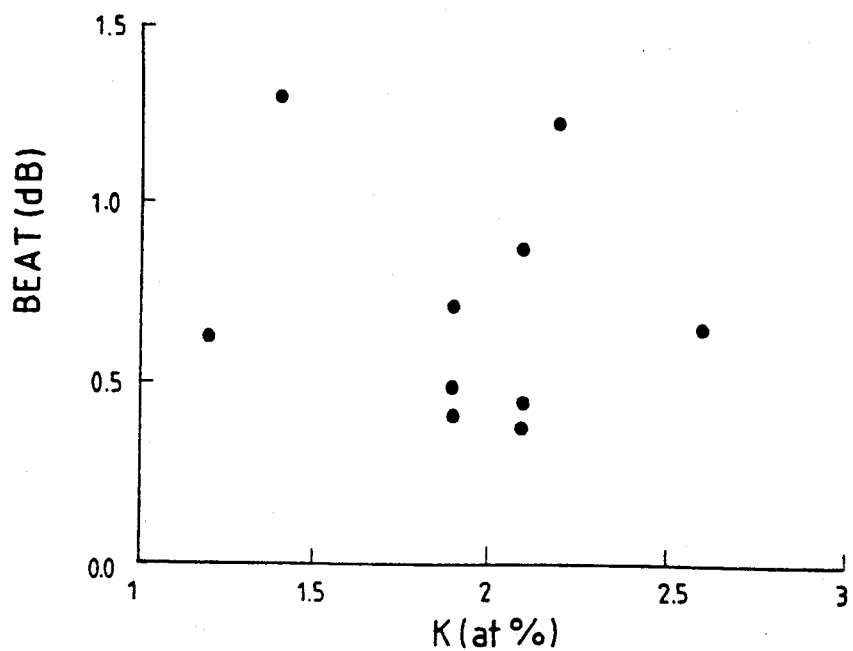
Figure 11E:
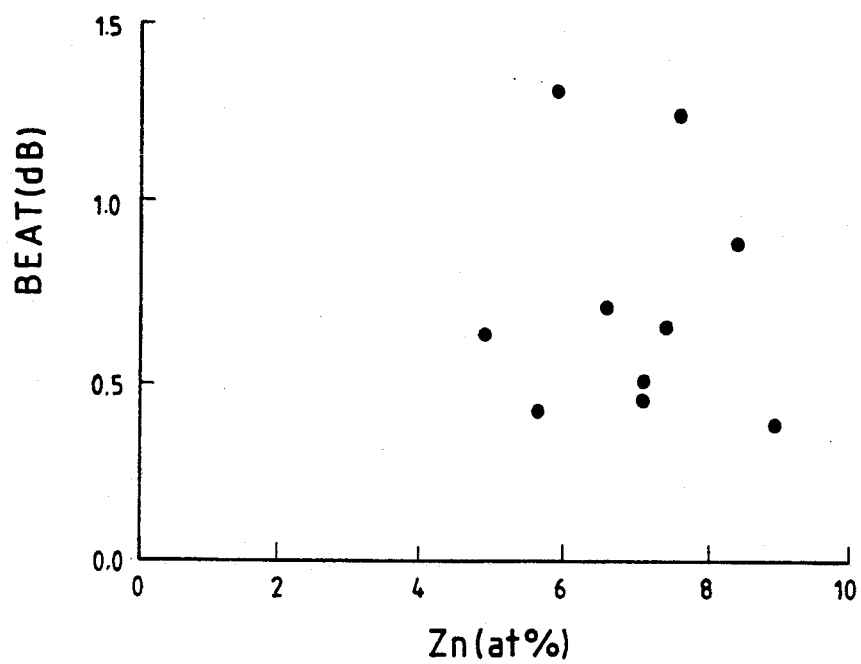
Figure 11F:
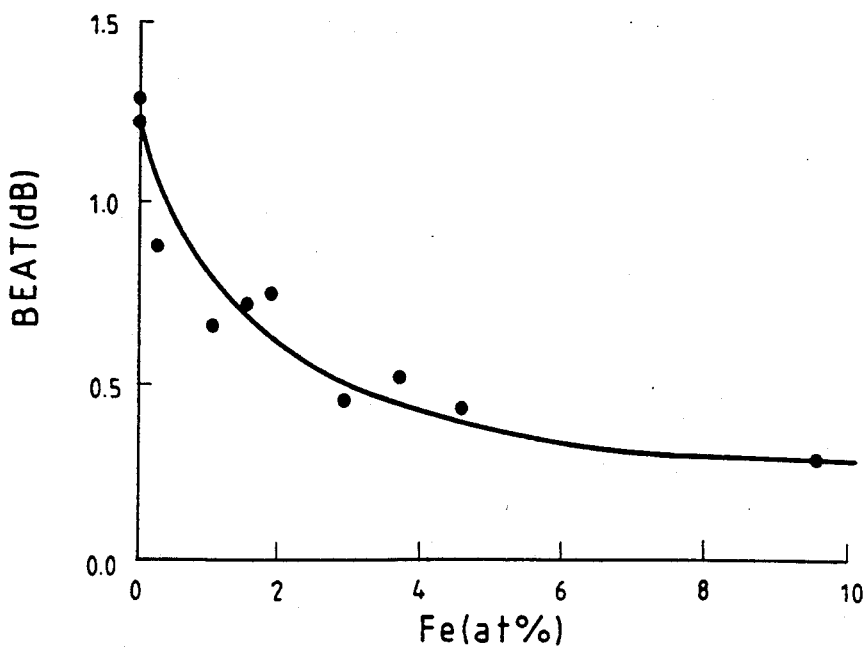

The present inventors plotted the frequency characteristic beat and reproduction output data of Table 6 against the angle θ to construct curves as shown in FIG. 10. Based on those curves, as taken together with the continuity of physical quantities, the present inventors estimated that if θ were set within the range of 0°-60° or 150°-180°, the overall rating of the frequency characteristic beats and reproduction output would be at least comparable to the characteristics obtained with sample Nos. 1-3.

It should be noted here that the above-discussed effect which is characteristic of the present invention does not reflect the synergism due to the sameness of crystal orientations of the single-crystal ferrites which constitute the two core halves but that it would be attributable to the superposition of the effects as achieved by the individual core halves. Therefore, even in the case where the single-crystal ferrites constituting the two core halves have different crystallographic orientations, the concept of the present invention needs only to be applied to at least one core half and this should be sufficient to provide the result that is the superposition of the effect on that core half which is unique to the present invention, as added to the characteristics of the other core half.

The MIG head to which the present invention can be applied is in no way limited to the head having the general appearance shown in FIG. 6; it may also be applied to h-ads having various structures of the surface opposite to a recording medium as shown in FIGS. 5A to 5D. FIG. 5A shows an MIG head having a thin ferromagnetic metal film 3a formed on only one core half 1a; FIG. 5B shows an MIG head having two thin ferromagnetic metal films 3a and 3b of different thickness formed on core halves 1a and 1b on opposite sides; FIG. 5C shows an MIG head in which the interface between the ferrite core portion of a core half 1a or 1b and a thin ferromagnetic metal film 3a or 3b is not parallel to the abutting surfaces of a magnetic gap 4 and FIG. 5D shows an MIG head in which the thin ferromagnetic metal film 3 may be formed in such a way that both of magnetic core halves 1a and 1b make indirect contact with the glass 5.

Figure 12A:
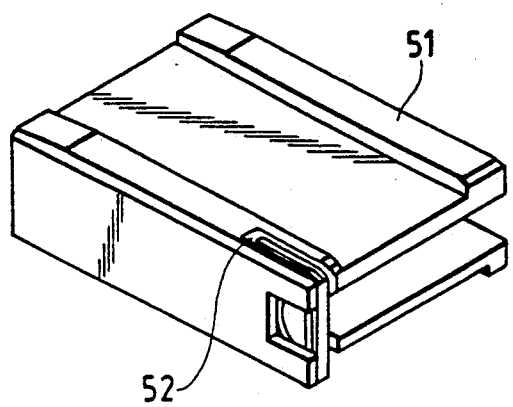
FIGS. 12A and 12B show MIG composite type of the magnetic head for use in HDD.
Figure 12B:
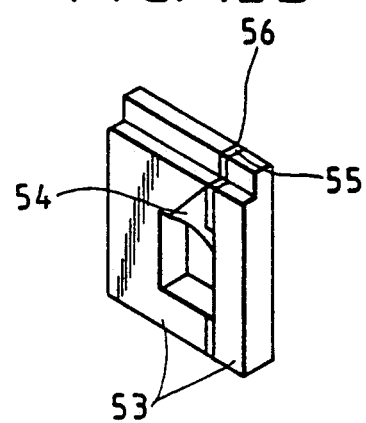

FIGS. 12A and 12B show MIG composite type of the magnetic head, for use in HDD, according to the present invention. In the drawings, reference numeral 51 defines a ceramic slider; 52, a mold glass; 53, Mn-Zn ferrites halves; 54, bonding glass; 55, Sendust films; and 56, magnetic gap.

Figure 12C:
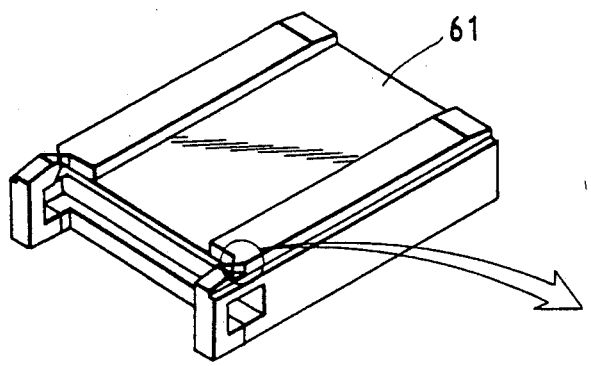
FIGS. 12C and 12D show MIG monolithic type of the magnetic head for use in HDD.
Figure 12D:
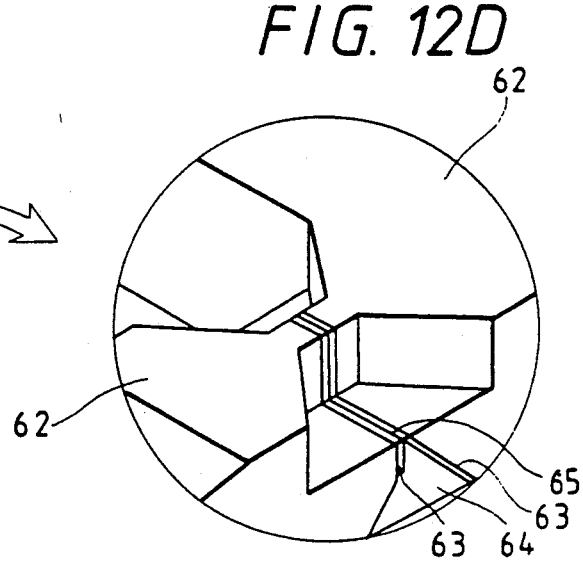

Moreover, FIGS. 12C and 12D show MIG monolithic type of the magnetic head, for use in HDD, according to the invention. In the drawings, reference numeral 61 defines a portion use for both slider and ferrite core; 62, ferrite; 63, Sendust film; 64, bonding glass; and 65, magnetic gap.

As described on the foregoing pages, compared to the parallel type MIG head that has a single-ferrite core portion and in which the principal magnetic path forming face and the gap-forming face are defined by {110} and {100} planes, respectively, each of the magnetic heads according to the present invention is at least equal or superior in their effectiveness in solving the problem of "pseudo-gap" in the parallel type MIG head and improving its reproduction output.

We claim:

1. An improved magnetic head comprising a pair of ferrite magnetic core halves, at least one of said magnetic core halves having a thin ferromagnetic metal film on a gap-forming face, said thin ferromagnetic metal film disposed with a non-magnetic material relative to the other magnetic core half to form a magnetic gap, and said pair of magnetic core halves being joined together by means of glass located near said magnetic gap, wherein said glass has a Fe content in the range of 2-13 at % of the glass composition excluding oxygen.

2. A magnetic head as claimed in claim 1 wherein said glass has a softening point in a range of 450° C-550° C.

3. A magnetic head as claimed in claim 1 wherein said pair of magnetic core halves are made of a single crystal ferrite and a principal magnetic path forming face of said magnetic core half provided with said thin ferromagnetic metal film has a crystal plane generally designated {211}, whereas a vector A that is parallel to a <110> crystal axis in said principal magnetic path forming face and that is directed away from the gap-forming face forms an angle θ of a range 0°-60° or 150°-180° with a vector B that is parallel to an intersection of the principal magnetic path forming face and the gap-forming face and that approaches the face opposite to a recording medium.

4. A magnetic head as claimed in claim 3, wherein the gap-forming face has a crystal plane generally designated {111}.

5. A magnetic head as claimed in claim 1 wherein said pair of magnetic core halves are made of a single-crystal ferrite, and a principal magnetic path forming face of the magnetic core half provided with said thin ferromagnetic metal film has a crystal plane generally designated {111}, whereas the gap-forming face has a crystal plane generally designated {110}.

6. A magnetic head as claimed in claim 1, wherein said pair of magnetic core halves are made of a single-crystal ferrite and a principal magnetic path forming face of the magnetic core half provided with said thin ferromagnetic metal film has a crystal plane generally designated {111}, whereas the gap-forming face has a crystal plane generally designated {211}.

7. A magnetic head as claimed in claim 1, wherein said pair of magnetic core halves are made of a single-crystal ferrite and a principal magnetic path forming face of the magnetic core half provide with said thin ferromagnetic metal film has a crystal plane generally designated {211}, whereas the gap-forming face has a crystal plane generally designated {110}.

* * * * *